United States Patent
Wang (10) Patent No.: US 10,036,621 B2
(45) Date of Patent: Jul. 31, 2018

(54) DISTANCE MEASURING WHEEL

(71) Applicant: Hung-Hui Wang, Taichung (TW)

(72) Inventor: Hung-Hui Wang, Taichung (TW)

(73) Assignee: Hung-Hui Wang, Taichung (TW)

( * ) Notice: Subject to any disclaimer, the term of this patent is extended or adjusted under 35 U.S.C. 154(b) by 104 days.

(21) Appl. No.: 15/260,341

(22) Filed: Sep. 9, 2016

(65) Prior Publication Data
US 2018/0073847 A1 Mar. 15, 2018

(51) Int. Cl.
*G01B 3/12* (2006.01)

(52) U.S. Cl.
CPC ..................... *G01B 3/12* (2013.01)

(58) Field of Classification Search
CPC .................. F16C 11/10; G01B 3/12
USPC .................................. 33/772, 779
See application file for complete search history.

(56) References Cited

U.S. PATENT DOCUMENTS

| | | | | |
|---|---|---|---|---|
| 4,176,458 A * | 12/1979 | Dunn | ...... | G01B 3/12 33/781 |
| 7,040,036 B1 * | 5/2006 | Wang | ...... | G01B 3/12 33/772 |
| 7,536,805 B1 * | 5/2009 | Tang | ...... | G01B 3/12 33/772 |
| 7,555,846 B1 * | 7/2009 | Wang | ...... | G01B 3/12 33/772 |
| 7,694,431 B2 * | 4/2010 | Tang | ...... | G01B 3/12 33/772 |
| 8,082,676 B2 * | 12/2011 | Tang | ...... | G01B 3/12 33/772 |
| 8,572,861 B2 * | 11/2013 | Lai | ...... | G01B 3/12 33/779 |
| 9,797,438 B1 * | 10/2017 | Wang | ...... | F16C 11/10 |
| 2010/0024235 A1 * | 2/2010 | Tang | ...... | G01B 3/12 33/782 |
| 2010/0024236 A1 * | 2/2010 | Tang | ...... | G01B 3/12 33/782 |

* cited by examiner

*Primary Examiner* — Yaritza Guadalupe-McCall (57) ABSTRACT

A distance measuring wheel includes a housing, two folding devices, an initialization device, a wheel, an initialization unit and a braking unit. The initialization unit includes first links which drives the swift plate of the initialization device. The braking unit includes second links which drives the brake pads of the initialization device such that the initialization and barking are independently operated and do not affect each other.

6 Claims, 11 Drawing Sheets

FIG. 11

DISTANCE MEASURING WHEEL

BACKGROUND OF THE INVENTION

1. Fields of the Invention

The present invention relates to a distance measuring wheel, and more particularly, to a foldable distance measuring wheel.

2. Descriptions of Related Art

The conventional distance measuring wheel generally includes a tubular frame, a wheel and a measuring gauge, wherein the digits changes when the wheel rolls so as to indicate the distance that the wheel travels. The wheel can be cooperated with brake device, and the gauge can be initialized.

The brake device and the initialization device are located on two sides of the frame, and can be easily affected with each other operating the distance measuring wheel. Besides, the cables in each of the brake device and the initialization device are easily worn out.

The present invention intends to provide a foldable distance measuring wheel wherein the cables are replaced by links so as to improve the shortcomings mentioned above.

SUMMARY OF THE INVENTION

The present invention relates to a distance measuring wheel and comprises a housing having a handle case and a tube unit which is connected to the handle case and comprises at least two tubes. An initialization device is connected to the housing. At least one folding device is connected between the at least two tubes. A wheel is pivotably connected to the initialization device. An initialization unit has a first button which is connected to the handle case and protrudes from one side of the handle case. Three first links are respectively located in the at least two tubes and the initialization device. The first link in the initialization device drives a swift plate of the initialization device. Two first cables are respectively connected between two of the three first links. A braking unit has a second button which is pivotably connected to the handle case and protrudes from the other side of the handle case. Three second links are respectively located in the at least two tubes and the initialization device. The second link in the initialization device drives a brake pad of the initialization device. Two second cables are respectively connected between two of the three second links.

Preferably, there are three tubes, three first cables, three second cables, four second links and four second links.

Preferably, the braking unit has a resilient member which is biased between the handle case and the second button.

Preferably, the initialization unit has another resilient member and a protrusion. The protrusion is connected to the handle case. The resilient member of the initialization unit is biased between the protrusion and the first button.

Preferably, the initialization unit has an S-shaped link which is connected to one of the first links and drives the swift plate, a pivotal member has two pivotal ends, and the S-shaped link is pivotably connected to one of the two pivotal ends, and the brake pad is pivotably connected to the other pivotal end.

Preferably, the first button protrudes toward a grip end of the handle case.

Preferably, there are two folding devices which are respectively connected between the at least two tubes, and a connection position between one of the at least two tubes and the initialization device.

The primary object of the present invention is to provide a distance measuring wheel wherein the first links for initialization and the second links for braking are not affect to each other so as to respectively drive the swift plate and the brake plate. Besides, the first button for initialization and the second button for braking are respectively located on two sides of the handle case such that the user can operate the two different buttons by one hand.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, the distance measuring wheel 100 of the present invention comprises a housing 200, an initialization device 300, a folding device 400, a wheel 500, an initialization unit and braking unit.

The distance measuring wheel 100 comprises the housing 200 and a tube unit 220, wherein the housing 200 has a handle case 210 and the tube unit 220 is connected to the handle case 210 and comprises at least two tubes 221. In this embodiment, there two tubes 221. The initialization device 300 is connected to the housing 200 by the folding device 400 which is connected between the at least two tubes 221. The initialization device 300 includes a measuring gauge which can be initialized, a swift plate 310 and a brake pad 320. The wheel 500 is pivotably connected to the initialization device 300.

Figure 1:
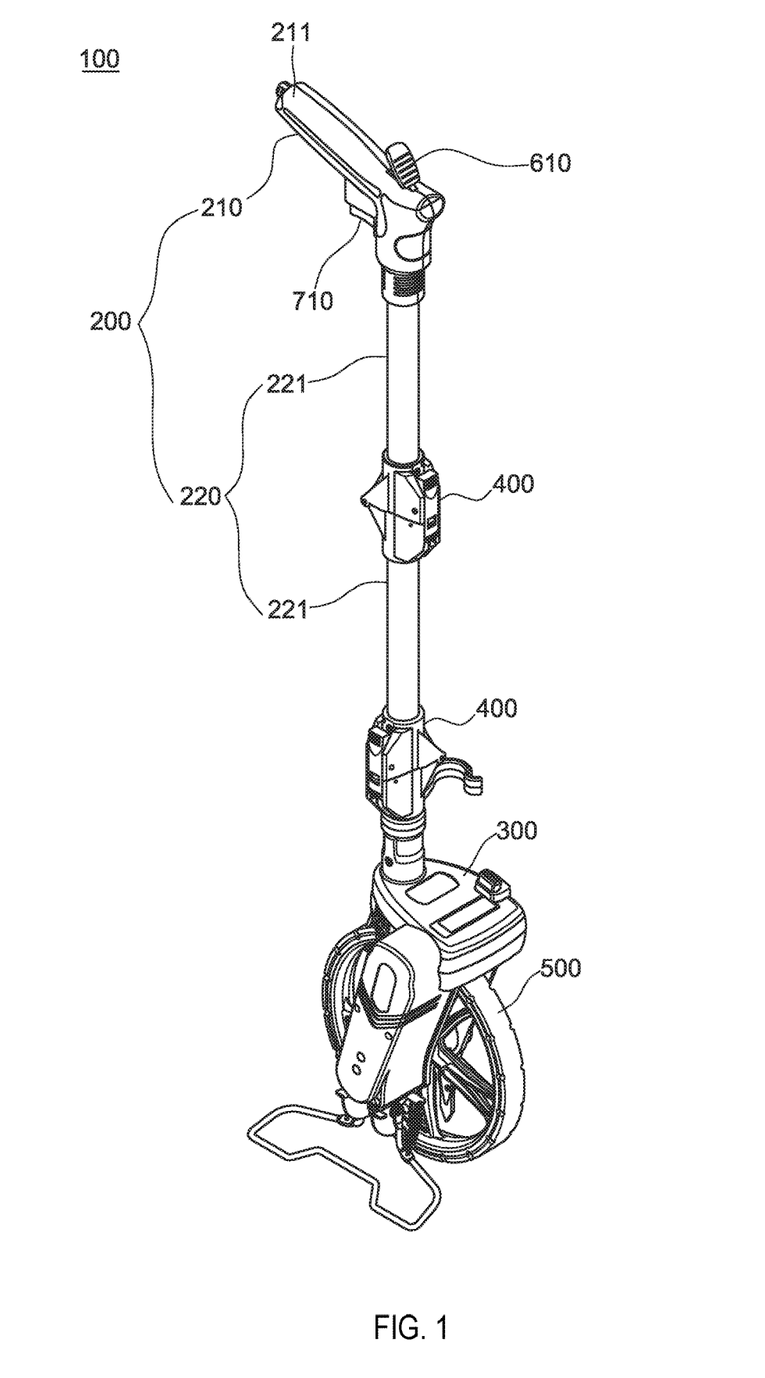
FIG. 1 is a perspective view to show the distance measuring wheel of the present invention.
Figure 2:
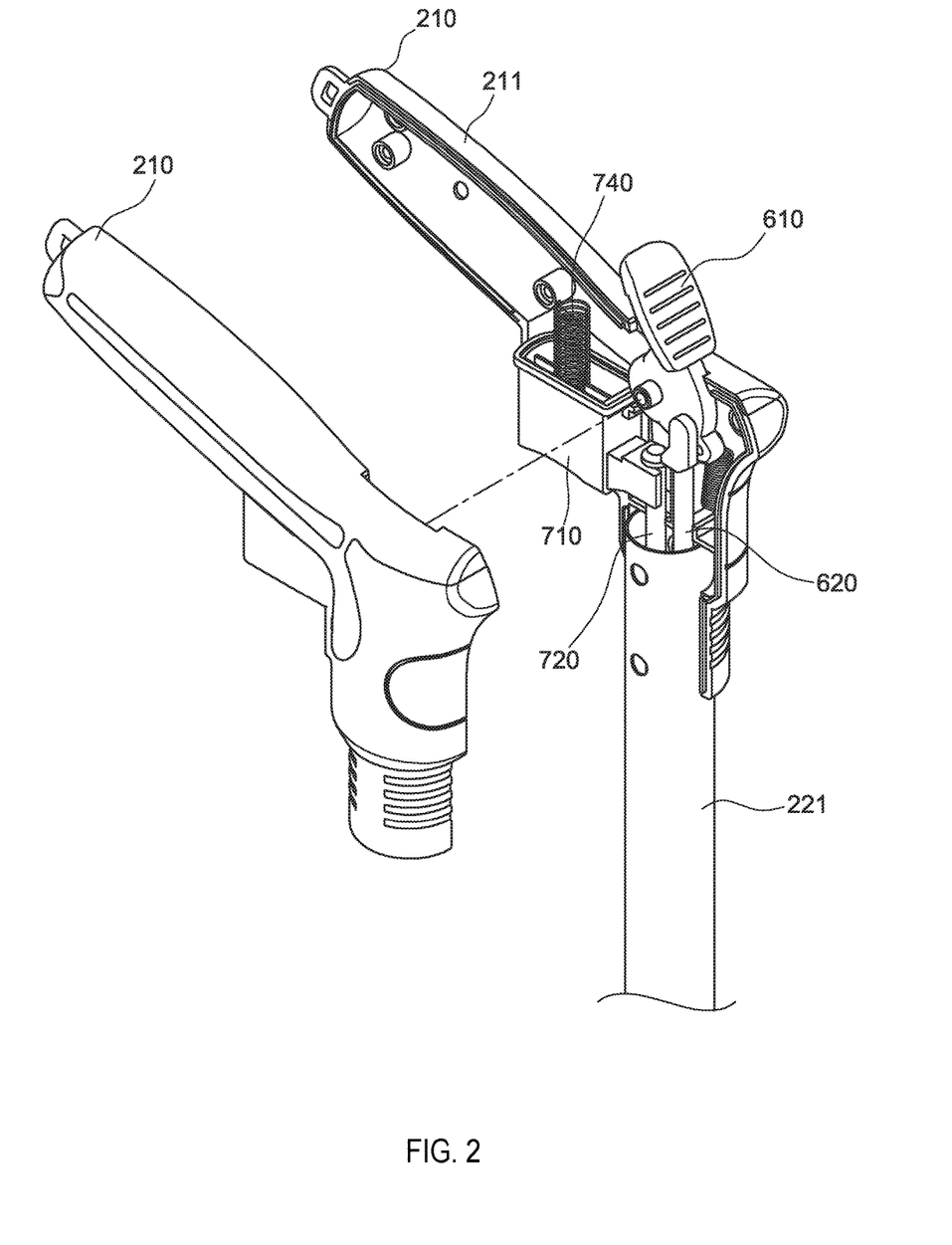
FIG. 2 is an exploded view of the handle case of the distance measuring wheel of the present invention.
Figure 3:
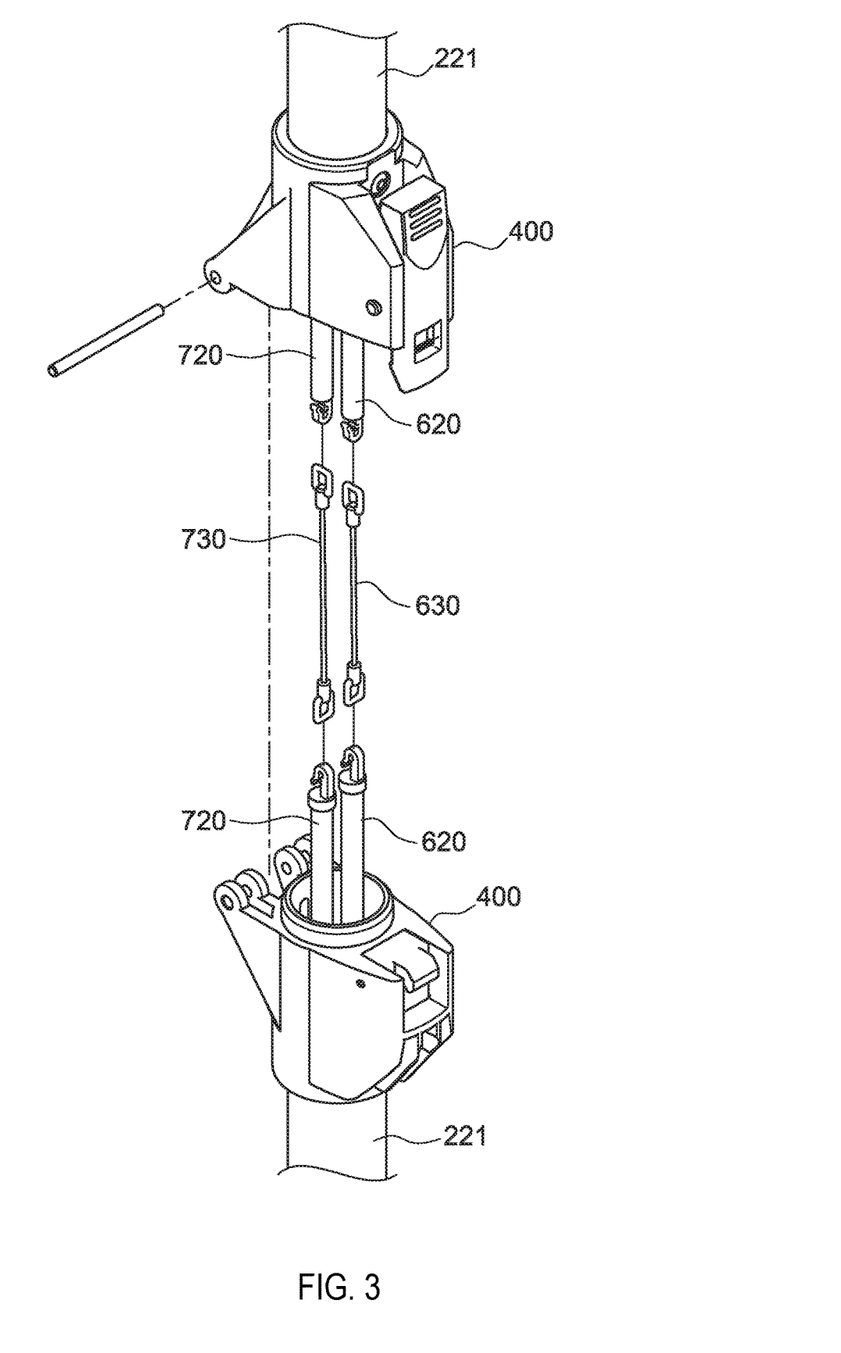
FIG. 3 is an exploded view to show the first and second links, cables and the folding device of the distance measuring wheel of the present invention.

The two folding devices 400 which are respectively connected between the two tubes 221, and the connection position between one of the two tubes 221 and the initialization device 300. The two tubes 221 are able to be folded at the folding devices 400.

Figure 4:
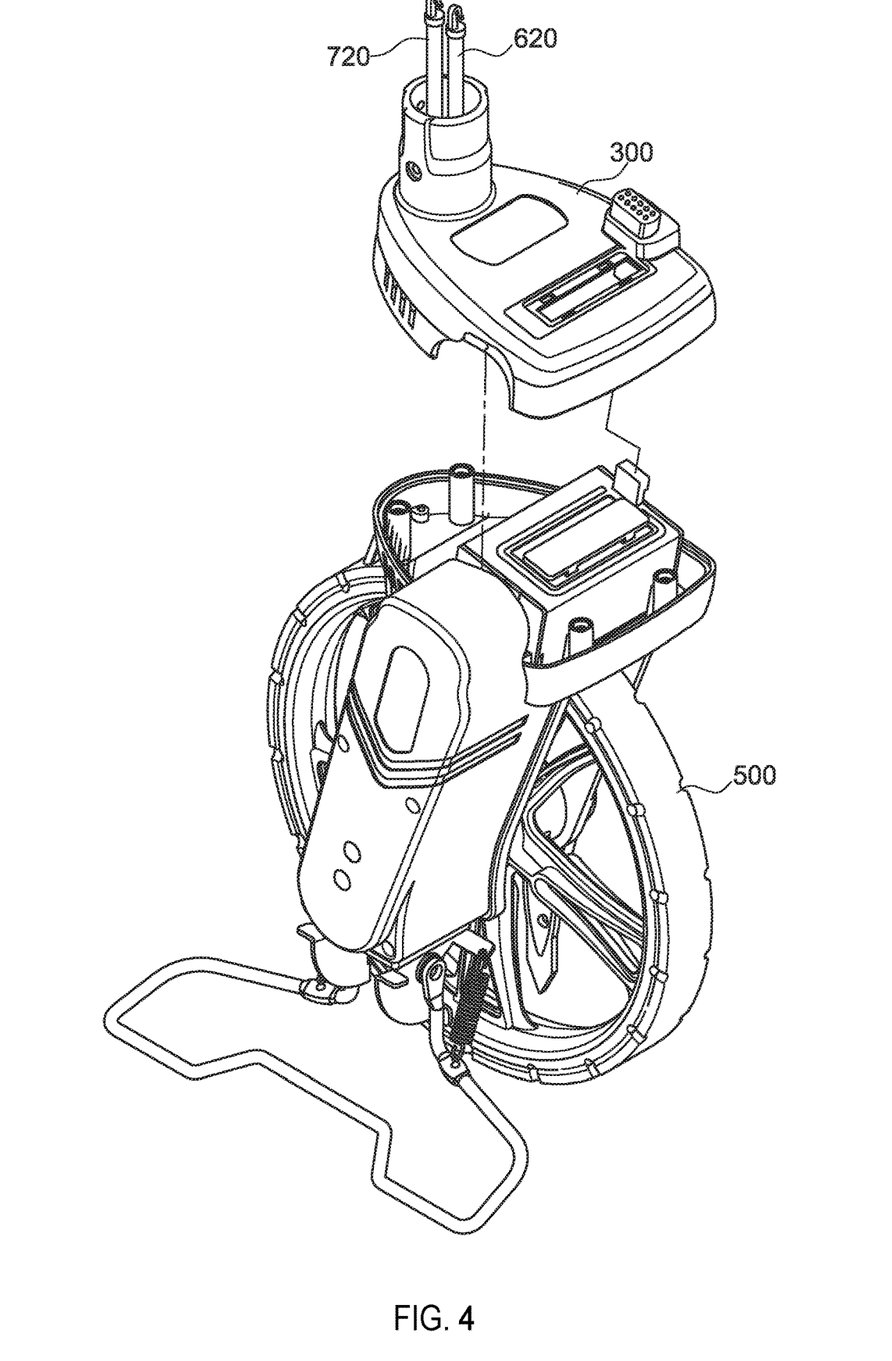
FIG. 4 is an exploded view to show the initialization device and the wheel of the distance measuring wheel of the present invention.

The wheel 500 is pivotably connected to the initialization device 300 so as to measure the distance that the wheel 500 travels.

An initialization unit includes a first button 610, three first links 620, two first cables 620, a S-shaped link 640, a pivotal member 650, a protrusion 660 and a resilient member 670. The first button 610 is connected to the handle case 210 and protrudes from one side of the handle case 210. The three first links 620 are respectively located in the two tubes 221 and the initialization device 300. The first link 620 that is located in the initialization device 300 drives the swift plate 310 of the initialization device 300. The two first cables 630 respectively connected between two of the three first links The S-shaped link 640 is connected to one of the first links 620 and drives the swift plate 310. The pivotal member 600 has two pivotal ends 651, and the S-shaped link 640 is pivotably connected to one of the two pivotal ends 651. The brake pad 320 is pivotably connected to the other pivotal end 651. The protrusion 660 is connected to the handle case 210. The resilient member 670 is biased between the protrusion 660 and the first button 610.

A braking unit having a second button 710, three second links 720, two second cables 730 and a resilient member 740, wherein the second button 710 is pivotably connected to the handle case 210 and protrudes from the other side of the handle case 210. The three second links 720 are respectively located in the at least two tubes 221 and the initialization device 300. The second link 720 that is located in the initialization device 300 drives the brake pad 320 of the initialization device 300. The two second cables 730 are respectively connected between two of the three second links 720. The resilient member 740 is biased between the handle case 210 and the second button 710.

If the users wants to increase the total length of the distance measuring wheel 100, the number of the parts can be set as three tubes 221, three first cables 630, three second cables 730, four second links 620 and four second links 720.

Figure 8:
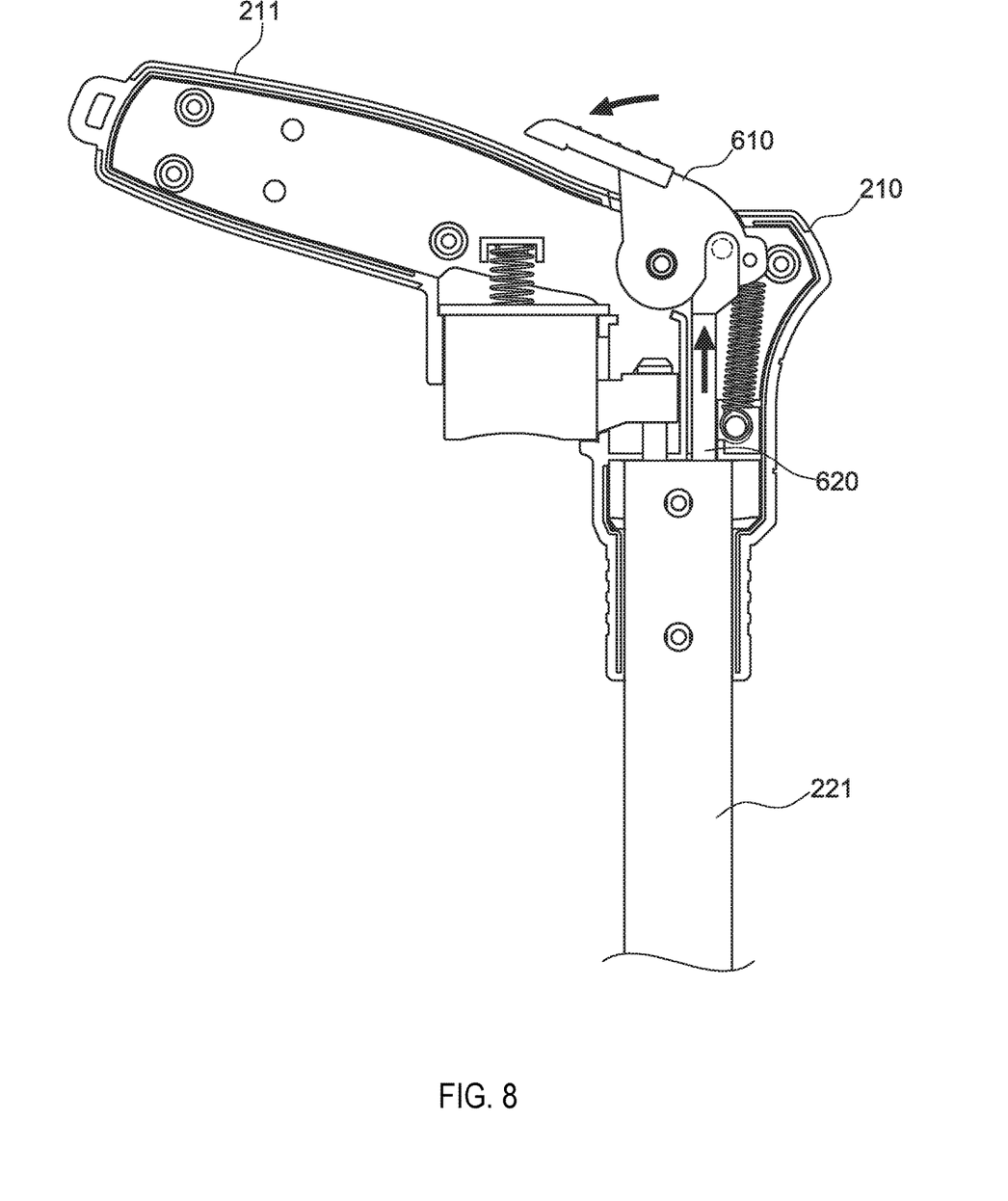
FIG. 8 shows that the first button is pushed to drive the first link of the initialization unit of the distance measuring wheel of the present invention.
Figure 9:
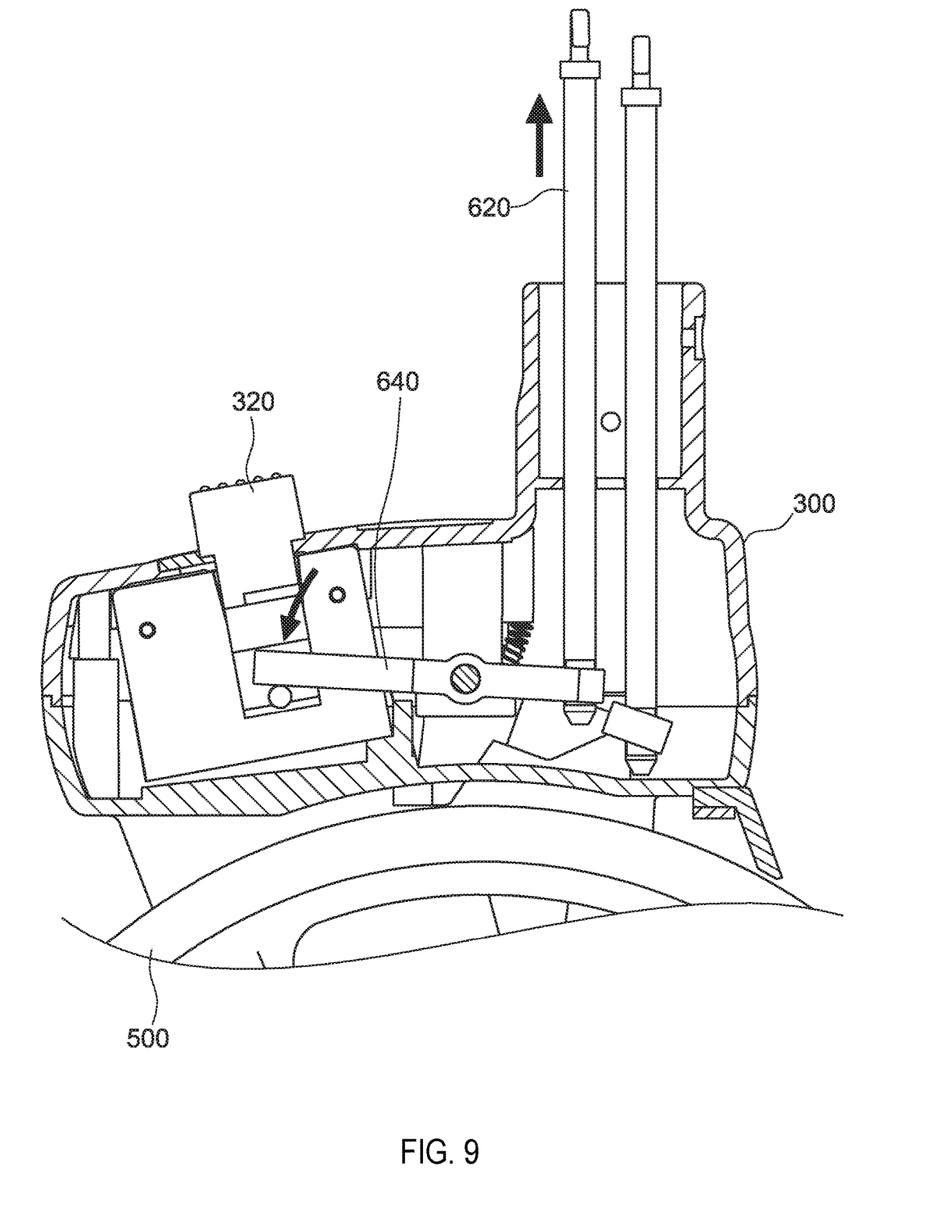
FIG. 9 shows that the first link drives the S-shaped link and the swift plate.

When the first button 610 is pressed, the first button 610 that is biased by the resilient member 670 drives the first link 620 in the tube 221. The first link 620 pulls the first cable 630 which pulls another first link 620 which drives the S-shaped link 640 of the pivotal member 650, and the swift plate 310 is activated so that the user simply holds the grip end 211 to control the initialization of the measuring gauge. The first button 610 returns back to its initial position by the resilient member 670.

Figure 10:
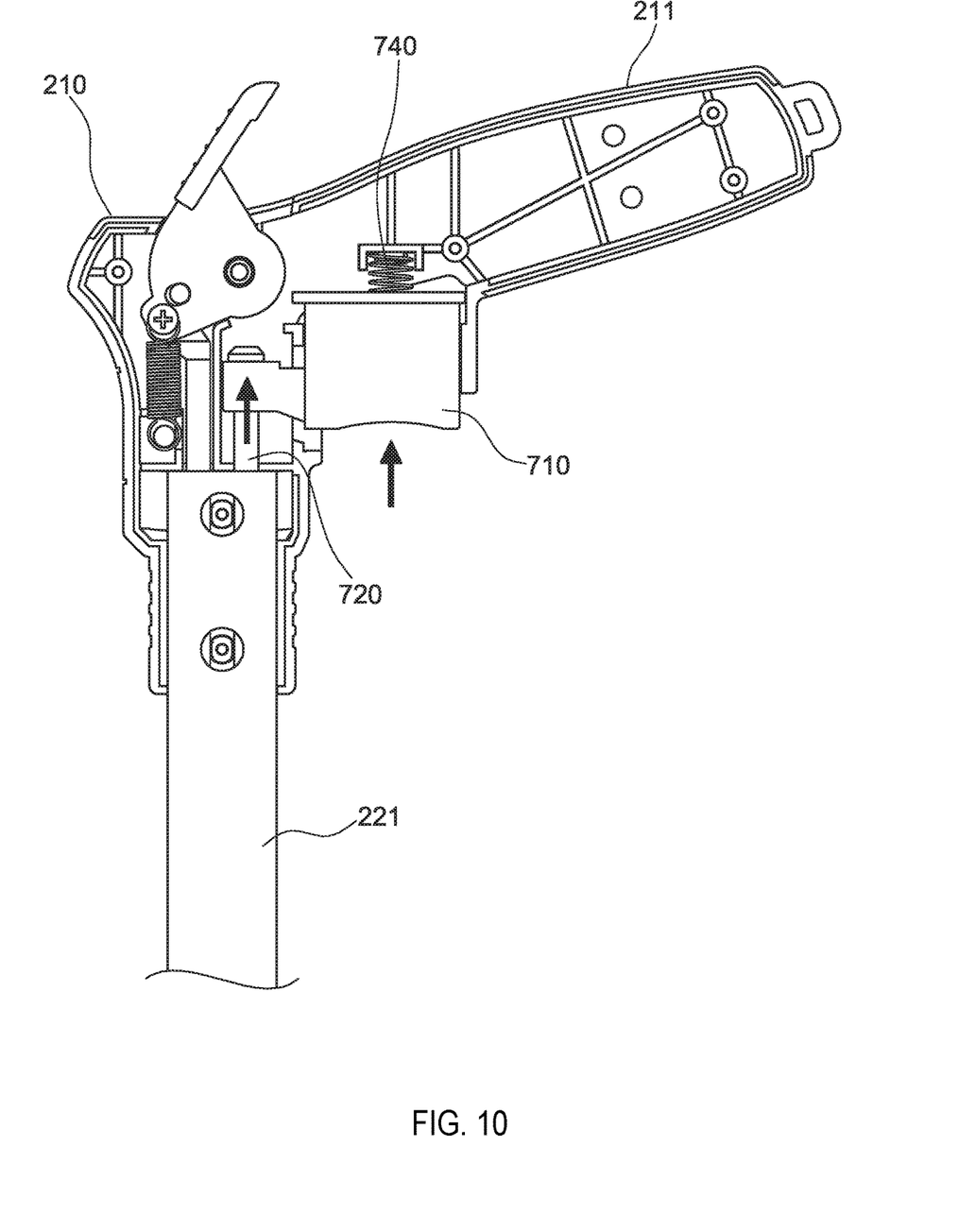
FIG. 10 shows that the second button is pushed to drive the second link of the braking unit of the distance measuring wheel of the present invention.
Figure 11:
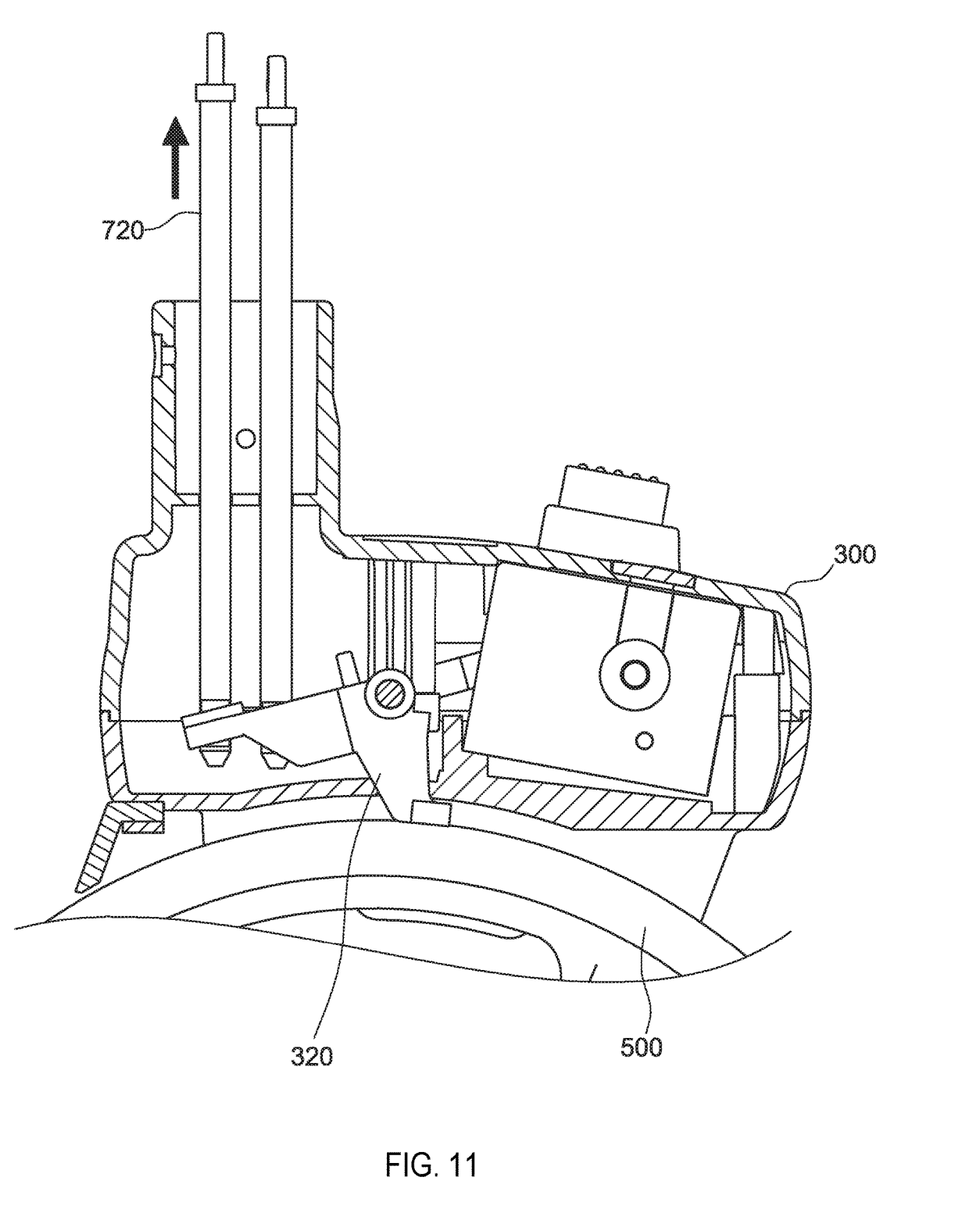
FIG. 11 shows that the second link drives the brake pad.

When the second button 710 is pressed, the second button 710 that is biased by the resilient member 740 drives the second link 720 in the tube 221. The second link 720 pulls the second cable 730 which pulls another second link 720 which drives the brake pad 320 to brake the wheel 500. The second button 710 returns back to its initial position by the resilient member 740.

The advantages of the present invention are that the first links 620 and the second links 720 do not affect to each other in the tubes 221, this enhances the reliability of the distance measuring wheel.

Figure 5:
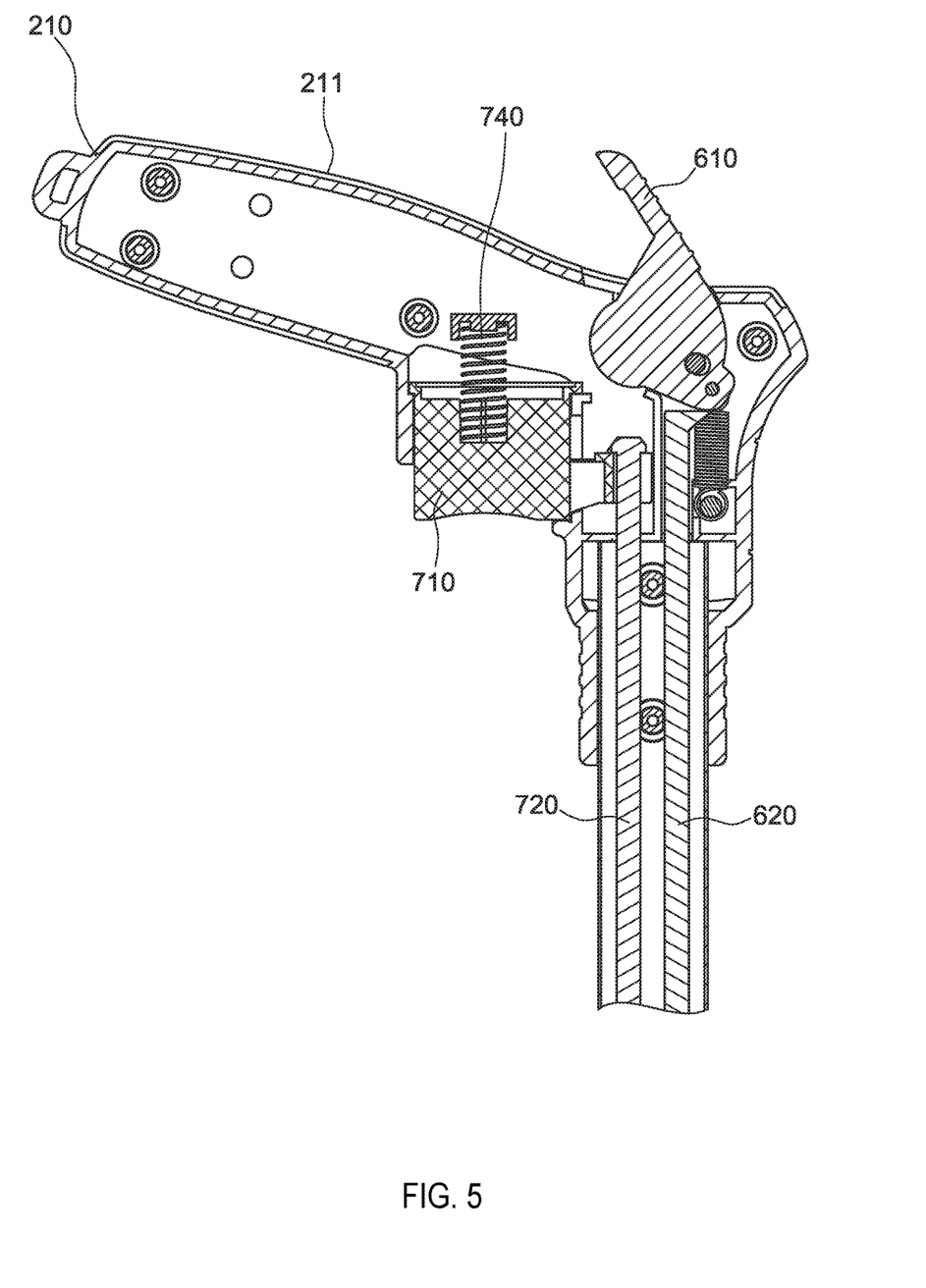
FIG. 5 is a cross sectional view of the handle of the distance measuring wheel of the present invention.
Figure 6:
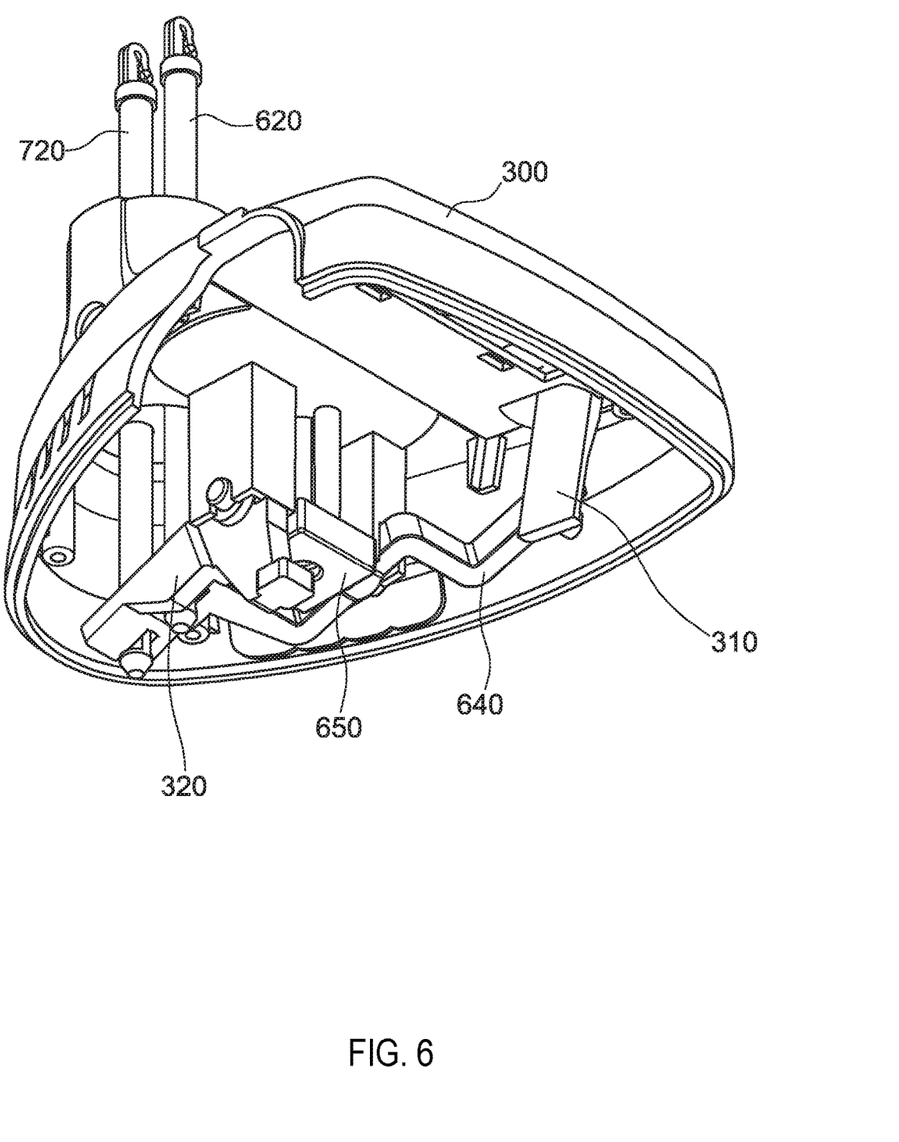
FIG. 6 shows a portion of the initialization unit and a portion of the braking unit of the distance measuring wheel of the present invention.
Figure 7:
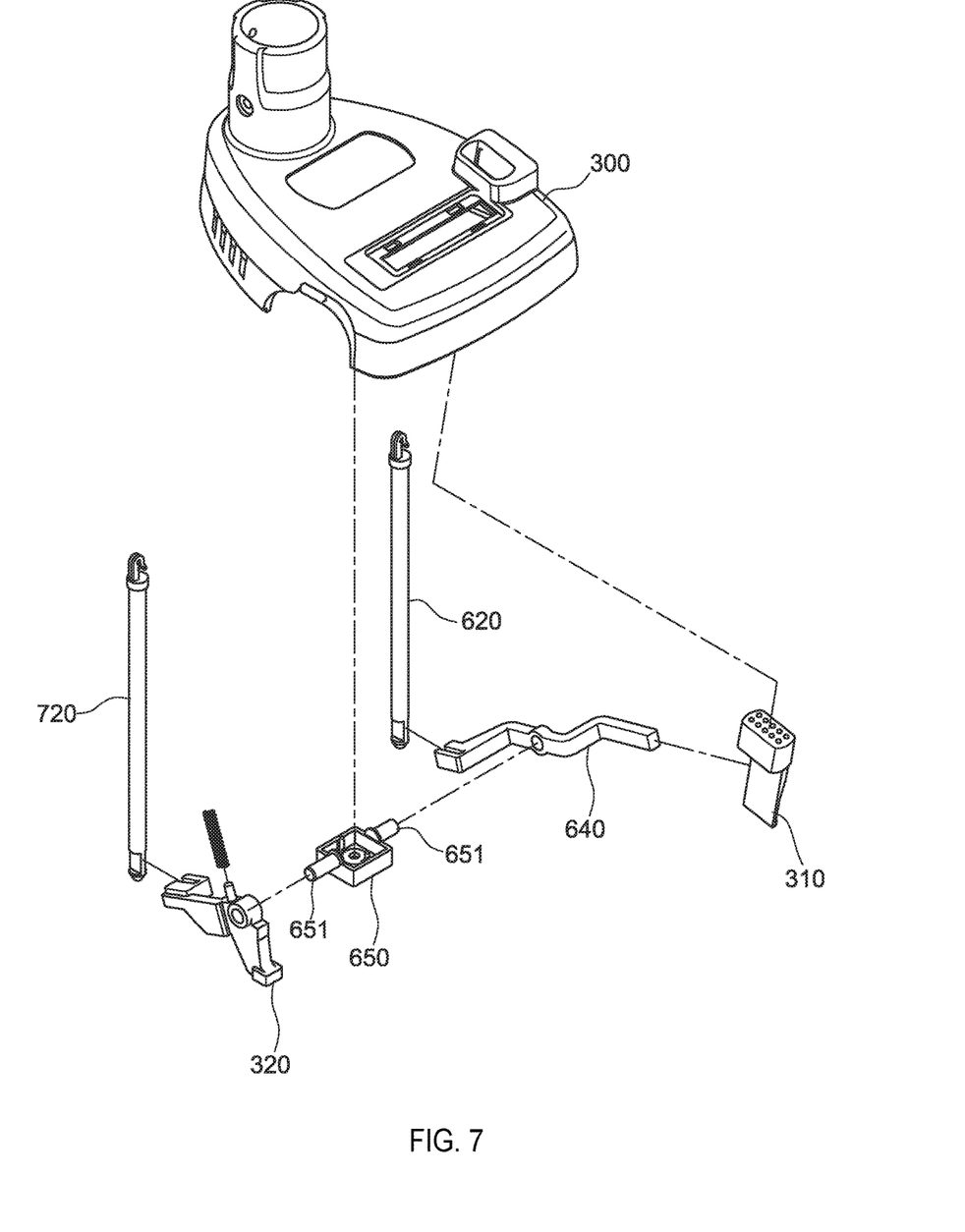
FIG. 7 is an exploded view to show a portion of the initialization unit and a portion of the braking unit of the distance measuring wheel of the present invention.

The first and second buttons 610, 710 are respectively located on two sides of the handle case 210, the first button 610 protrudes toward the grip end 211 of the handle case 210 such that the user can easily operates the function of initialization and braking by one hand.

While we have shown and described the embodiment in accordance with the present invention, it should be clear to those skilled in the art that further embodiments may be made without departing from the scope of the present invention.

What is claimed is:

1. A distance measuring wheel comprising:
a housing having a handle case and a tube unit which is connected to the handle case and comprises at least two tubes;
an initialization device connected to the housing;
at least one folding device connected between the at least two tubes;
a wheel pivotably connected to the initialization device;
an initialization unit having a first button which is connected to the handle case and protrudes from one side of the handle case, three first links respectively located in the at least two tubes and the initialization device, the first link in the initialization device drives a swift plate of the initialization device, two first cables respectively connected between two of the three first links; and
a braking unit having a second button which is pivotably connected to the handle case and protruding from the other side of the handle case, three second links respectively located in the at least two tubes and the initialization device, the second link in the initialization device drives a brake pad of the initialization device, two second cables respectively connected between two of the three second links;
wherein the initialization unit has an S-shaped link which is connected to one of the first links and drives the swift plate, a pivotal member has two pivotal ends, the S-shaped link is pivotably connected to one of the two pivotal ends, the brake pad is pivotably connected to the other pivotal end.

2. The distance measuring wheel as claimed in claim 1, wherein there are three tubes, three first cables, three second cables, four second links and four second links.

3. The distance measuring wheel as claimed in claim 1, wherein the braking unit has a resilient member which is biased between the handle case and the second button.

4. The distance measuring wheel as claimed in claim 1, wherein the initialization unit has another resilient member and a protrusion, the protrusion is connected to the handle case, the resilient member of the initialization unit is biased between the protrusion and the first button.

5. The distance measuring wheel as claimed in claim 1, wherein the first button protrudes toward a grip end of the handle case.

6. The distance measuring wheel as claimed in claim 1, wherein there are two folding devices which are respectively connected between the at least two tubes, and a connection position between one of the at least two tubes and the initialization device.

* * * * *